United States Patent
Polanich (10) Patent No.: US 10,288,047 B2
(45) Date of Patent: May 14, 2019

(54) ELASTIC ENERGY STORAGE AND DEPLOYMENT SYSTEM

(71) Applicant: SERPENT RURAL SPORTS LLC, Los Gatos, CA (US)

(72) Inventor: Jonathan C. Polanich, Los Gatos, CA (US)

(73) Assignee: SERPENT RURAL SPORTS LLC, Los Gatos, CA (US)

( * ) Notice: Subject to any disclaimer, the term of this patent is extended or adjusted under 35 U.S.C. 154(b) by 150 days.

(21) Appl. No.: 15/491,418

(22) Filed: Apr. 19, 2017

(65) Prior Publication Data

US 2017/0328353 A1   Nov. 16, 2017

Related U.S. Application Data

(60) Provisional application No. 62/336,305, filed on May 13, 2016.

(51) Int. Cl.
| F41B 7/00 | (2006.01) |
| F41B 5/00 | (2006.01) |
| F03G 1/02 | (2006.01) |

(52) U.S. Cl.
CPC ............. *F03G 1/02* (2013.01); *F41B 5/0094* (2013.01); *F41B 7/00* (2013.01)

(58) Field of Classification Search
CPC .... F41B 3/00; F41B 3/005; F41B 3/03; F41B 5/0094; F41B 7/00; F41B 7/04; F03G 1/02; F16F 15/1213; F16F 15/1333
See application file for complete search history.

(56) References Cited

U.S. PATENT DOCUMENTS

| 2,821,379 | A | * | 1/1958 | Donkin ..................... F16F 1/10 267/156 |
| 4,903,677 | A | | 2/1990 | Colley et al. |
| 8,567,376 | B2 | | 10/2013 | Flint |
| 9,067,118 | B2 | * | 6/2015 | Colding-Kristensen ..................... A63B 69/408 |
| 9,303,943 | B2 | * | 4/2016 | Breslin ..................... F41B 7/00 |
| 9,389,041 | B2 | * | 7/2016 | Novikov .................. F41B 7/00 |
| 9,651,331 | B2 | * | 5/2017 | Kim ........................ F41B 5/12 |
| 2009/0032002 | A1 | * | 2/2009 | Howard ............... F41B 5/0094 124/25.6 |

* cited by examiner

*Primary Examiner* — John A Ricci
(74) *Attorney, Agent, or Firm* — Innovation Capital Law Group, LLP; Vic Lin

(57) ABSTRACT

An elastic energy storage and deployment system deploys a torsional spring that bias a cam connected to a cable. The cam is coupled to the torsion spring about a shared rotational axis such that the cam directs elastic energy to and from the torsion spring and the cable transforms rotational force into linear motion, with little rotational inertia, and the addition of angular acceleration.

15 Claims, 13 Drawing Sheets

ELASTIC ENERGY STORAGE AND DEPLOYMENT SYSTEM

BACKGROUND OF THE INVENTION

1. Field of the Invention

One or more embodiments of the invention relates generally to elastic energy storage and deployment systems within compact arrow launching devices that utilize counteracting block and tackle pulley systems. Particularly, embodiments of the invention relate to elastic energy storage and deployment systems that direct force to a series of pulleys that extend and retract a launching cord in a general serpentine path.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Prior art methods of storing and deploying elastic energy to extend and retract are known. Conventional devices, such as elastomers, like rubber tubes and bands, and coil springs made of metal, composite or polymers, can be used for performing these methods.

However, these conventional systems have limitations. While elastomers, like rubber, can store and release elastic energy along a linear course at high velocity due to its low mass, it is not compact and requires significant distance to extend the elastomer to a functional length.

While metal, composite and polymer extension and compression springs can be more reliable over a range of temperatures as compared to rubber springs, they also require considerable distance to extend or compress to a functional length. In addition, the higher mass of the metal compression or extension springs imposes a velocity limitation, as significant energy is required to extend or retract the spring's own mass, greatly reducing the available energy for accelerating an arrow.

In addition, conventional systems of elastic energy storage and deployment are known to produce shock loading on the launching cord after deployment, resulting is faster cord wear or breakage. In the case of brittle composite springs, shock loading can even damage the spring itself. When metal extension and compression springs are used, the shock loading also produces loud resonance vibrations through the coils after being deployed.

It is therefore an object of the present invention to provide an elastic energy storage and deployment system that can overcome the above limitations.

SUMMARY OF THE INVENTION

Aspects of the present invention are achieved by providing an elastic energy storage and deployment system comprising a torsion spring having at least one fixed first arm and one movable arm. A cam having a circular or elliptical sector profile is connected to the movable arm of the torsion spring in a position that aligns the arc at the top of the cam with the travel arc of the spring arm. A fixed axle is positioned within the coils of the torsion spring and within the pivot-point of the cam. A flexible cable having two ends is aligned within a channel along the length of the top of the cam, with the first end of the cable connected to the end of the arc that is opposed to the direction of the torsion spring wind and the second free end of the cable connectable to a movable pulley or pulley block within a compact arrow launching device having a counter-acting block and tackle.

An aspect of the invention provides a method for storing and deploying elastic energy to movable pulleys or pulley blocks within a compact arrow launching device having a counter-acting block and tackle. The method comprises the steps of providing elastic energy storage and deployment devices, providing a compact arrow launching device containing a counter-acting block and tackle, mounting the elastic energy storage and deployment devices at the movable ends of each block and tackle in a compact arrow launching device, connecting the free cable end of each elastic energy storage and deployment device to a corresponding movable pulley or movable pulley block such that the cooperative movement of the cables and cams guide and maintain each pulley or pulley block along a linear course throughout the duration of tensioning of the launching cord to full capacity and the duration of releasing the tension of the launching cord of the compact arrow launching device.

Another aspect of the invention provides a system for absorbing shock loads while deploying elastic energy along a linear course comprising a torsion spring having at least one fixed first arm and one movable arm, a cam having a circular or elliptical sector profile is connected to the movable arm of the torsion spring in a position that aligns the arc at the top of the cam with the travel arc of the spring arm, and/or a cam rest having deformable shape memory properties mounted in front of the cam opposite the spring wind direction, a fixed axle positioned within the coils of the torsion spring and the pivot-point of the cam, a cable and or having elastic properties, having two ends is aligned within a channel along the length of the top of the cam, with the first end of the cable connected to the end of the arc that is opposed to the direction of the torsion spring wind and the second free end of the cable connectable to a movable pulley or pulley block within a compact arrow launching device having a counter-acting block and tackle.

Embodiments of the present invention provide an elastic energy storage and deployment device comprising a torsion spring having at least one fixed first arm and one movable arm; a cam having a circular or elliptical sector profile connected to the movable arm of the torsion spring; a fixed axle positioned within coils of the torsion spring and within a pivot-axis of the cam; a fixed pin connected to the at least one fixed arm of the torsion spring; and a flexible cable having a first end and a second end, the first end and second end aligning the flexible cable within a channel along a length of a top portion of the cam, the first end of the cable connected at one end of the cam arc that is opposed to a direction of the torsion spring wind.

Embodiments of the present invention further provide an elastic energy storage and deployment device comprising at least one torsion spring having at least one fixed first arm and at least one movable arm; a cam having a circular or elliptical sector profile connected to the movable arm of the torsion spring in a position that aligns a cam arc of the circular or elliptical sector profile at a top of the cam with a travel arc of the movable arm; a fixed axle positioned within coils of the torsion spring and within a pivot-axis of the cam; a fixed pin connected to the at least one fixed arm of the torsion spring; and a flexible cable having a first end and a second end, the first end and second end aligning the flexible cable within a channel along a length of the top of the cam, the first end of the cable connected at one end of the cam arc that is opposed to a direction of the torsion spring wind.

In some embodiments, the torsion spring may be a spiral torsion spring having a fixed arm and a movable arm. In some embodiments, the inner arm of the spiral torsion spring may be fixed (for example, to a fixed axle) and the outer arm may be movable. In this embodiment, the cam can be connected to the movable outer arm while the axle, providing a pivot axis of the cam, is fixed as the cam pivots thereabout. In other embodiments, the inner arm of the spiral torsion spring may be movable, while the outer arm is fixed (to a fixed pin, for example). In this embodiment, the cam can be fixed to the axle, and the axle is moved by the spiral torsion spring to rotate the cam.

Embodiments of the present invention also provide a projectile launching device comprising an elastic energy storage and deployment device comprising at least one torsion spring having at least one fixed first arm and at least one movable arm; a cam having a circular or elliptical sector profile connected to the movable arm of the torsion spring; a fixed axle positioned within coils of the torsion spring and within a pivot-axis of the cam; a fixed pin connected to the at least one fixed arm of the torsion spring; and a flexible cable having a first end and a second end, the first end and second end aligning the flexible cable within a channel along a length of the top of the cam, the first end of the cable connected at one end of the cam arc that is opposed to a direction of the torsion spring wind; and a pulley of block and tackle system attached to the second end of the flexible cable.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an elastic energy storage and deployment system that deploys a torsional spring which, in turn, bias a cam connected to a cable. The cam is coupled to the torsion spring about a shared rotational axis such that the cam directs elastic energy to and from the torsion spring and the cable transforms rotational force into linear motion, with little rotational inertia, and the addition of angular acceleration.

Referring to FIGS. 1 through 9, wherein like reference numerals refer to like components in the various views, there is illustrated therein a new and improved elastic energy storage and deployment system 100, also simply referred to as system 100.

Figure 1A:
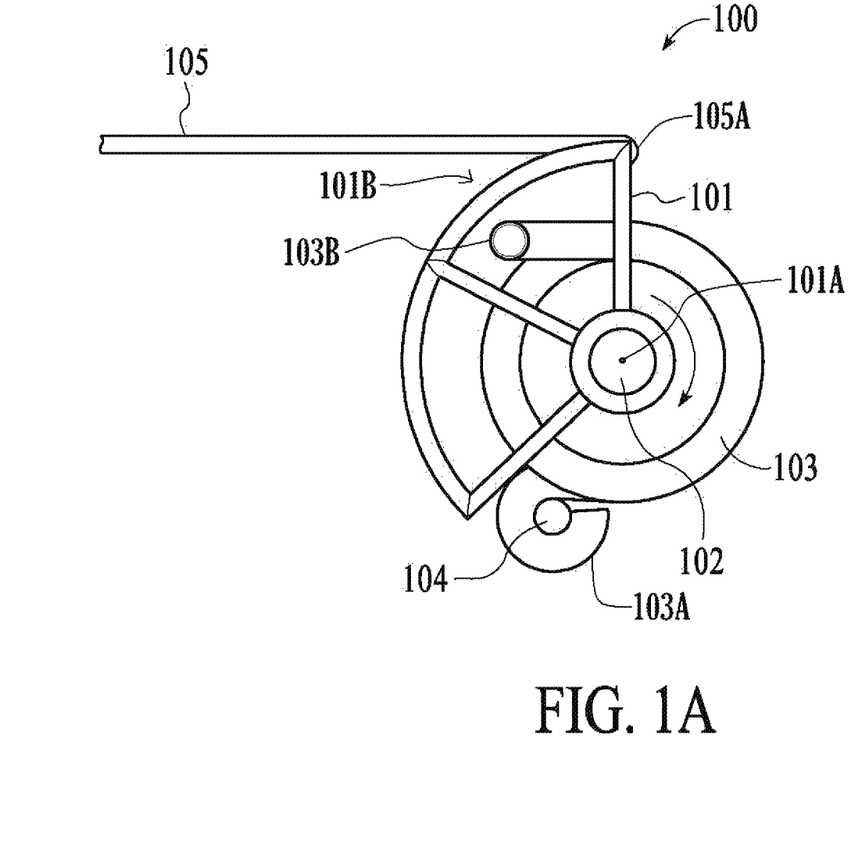
FIG. 1A is side elevation view of an elastic energy storage and deployment system in a fully tensioned position, according to an exemplary embodiment of the present invention.
Figure 1B:
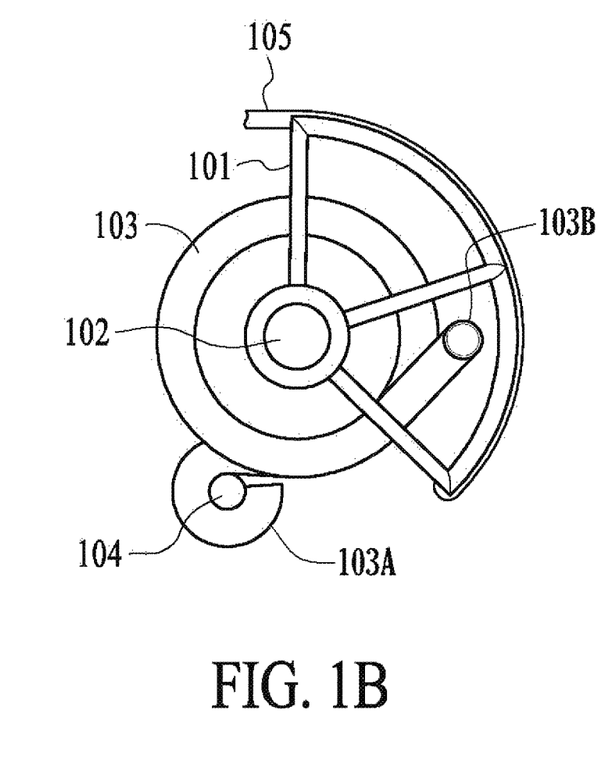
FIG. 1B is side elevation view of the system of FIG. 1A in a fully deployed position.

As illustrated in FIG. 1A and FIG. 1B, in accordance with an embodiment of the present invention, the elastic energy storage and deployment system 100 has a cam 101, having a circular-sector profile, mounted at its pivot-point 101A to a fixed axle 102 so that it may freely rotate around the fixed axle 102. The circular-sector profile may span an arc from about 75 to about 210 degrees, typically from about 90 to about 180 degrees. The pivot point 101A in cam 101 may include bearings (not shown) to further reduce friction around fixed axle 102. A torsion spring 103, having a fixed arm 103A and a moveable arm 103B, is positioned such that fixed axle 102 is sheathed by the coils of the torsion spring and such that the fixed arm 103A of the torsion spring is attached to a fixed pin 104 and moveable arm 103B of the torsion spring engages cam 101.

Figure 9:
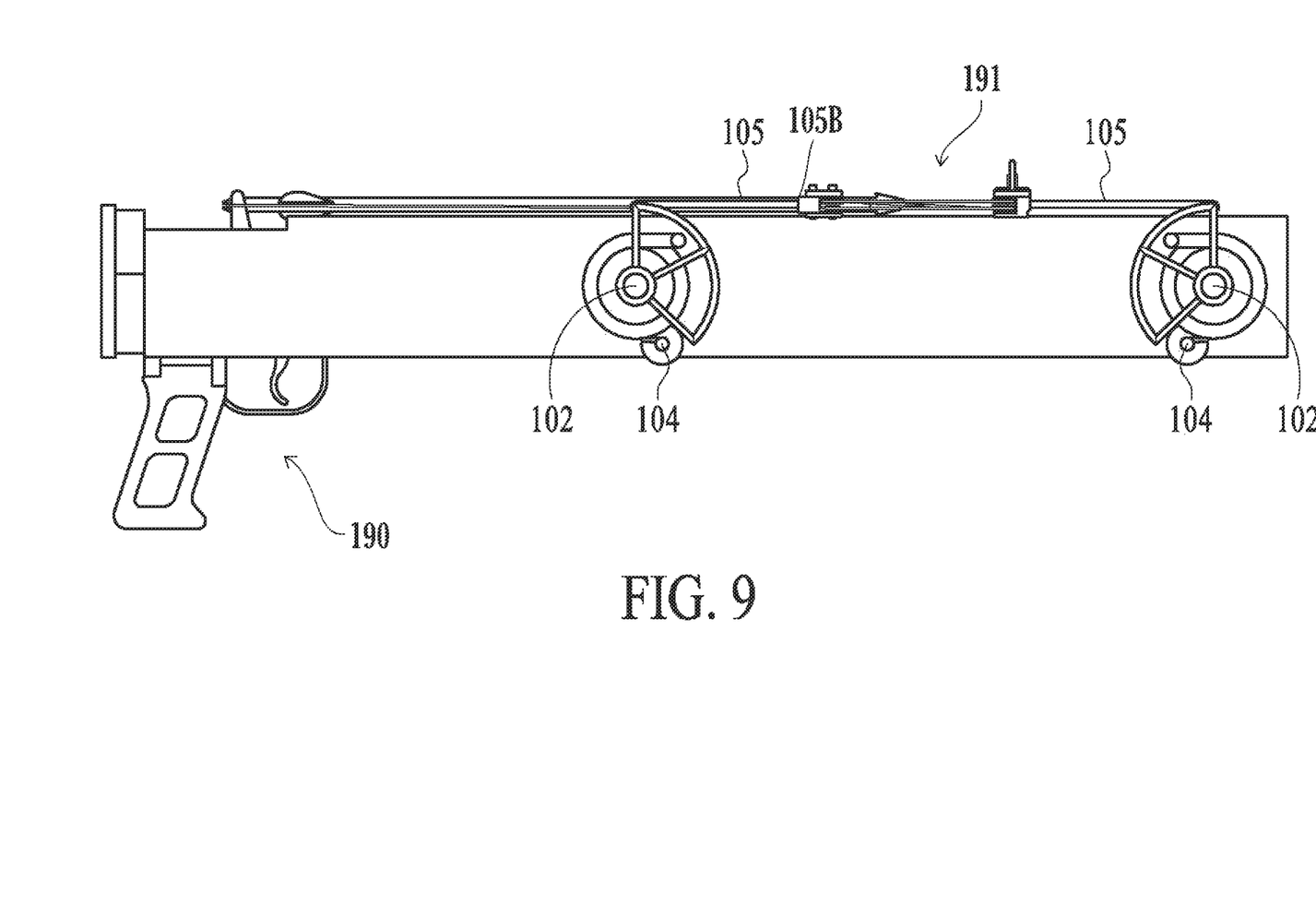
FIG. 9 is a side elevation showing the device attached within a compact arrow launching device having counter-acting block and tackle.

A flexible cable 105, having two ends, is aligned within a channel 101B at the top of cam 101 such that one end 105A of cable 105 is attached at the end of the cam arc opposite the wind of the torsion spring 103 and the other end 105B (also referred to as free cable ends 105B, see FIG. 5A) is attachable to a movable pulley or pulley block 150 (see FIG. 5) within a compact arrow launching device 190 (see FIG. 9). FIG. 1A shows the system 100 storing the elastic energy of the torsion spring 103 as cam 101 maintains the tension within cable 105. FIG. 1B depicts system 100 in a fully deployed position, as the elastic energy within torsion spring 103 has rotated cam 101 in a clockwise direction, guiding the cable 105 over the top of cam 101 in the same direction but maintaining the free cable end at the same vertical position as FIG. 1A and throughout deployment.

Figure 2A:
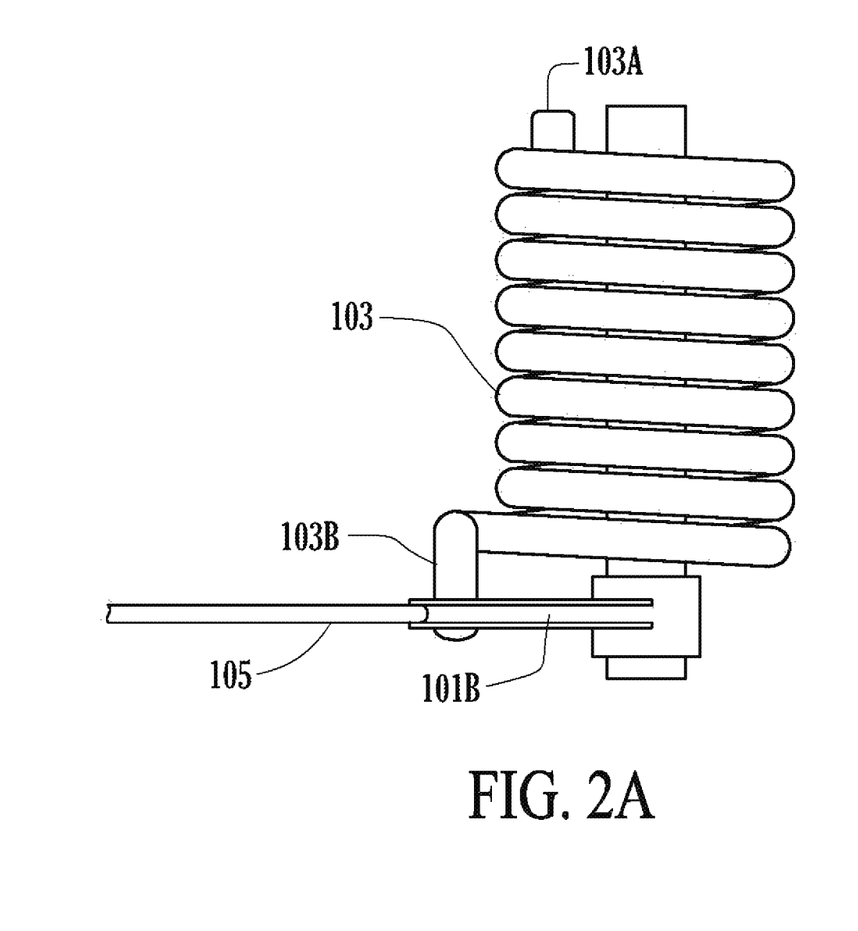
FIG. 2A is a top plan view of the system of FIG. 1A in a fully tensioned position.
Figure 2B:
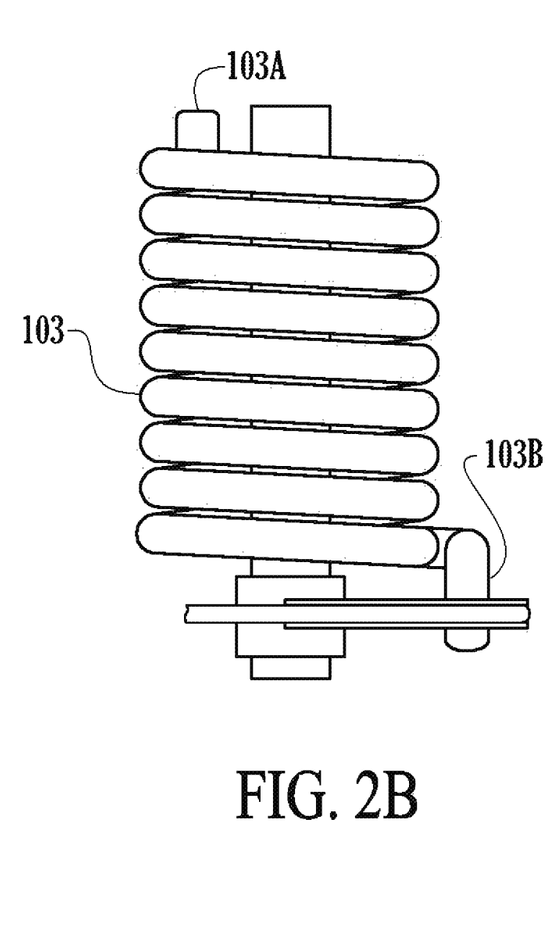
FIG. 2B is a top plan view of the system of FIG. 1A in a fully deployed position.
Figure 3A:
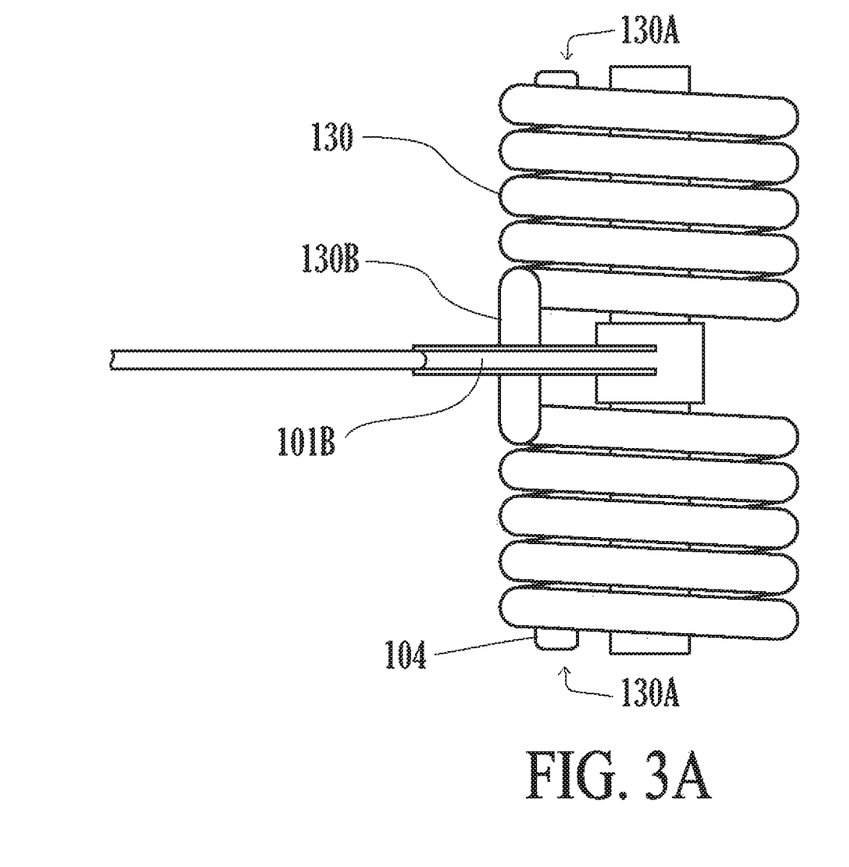
FIG. 3A is a top plan view of an elastic energy storage and deployment system with a double-fixed-arm torsion spring and cam positioned with coils on either side, in a fully tensioned position, according to an exemplary embodiment of the present invention.
Figure 3B:
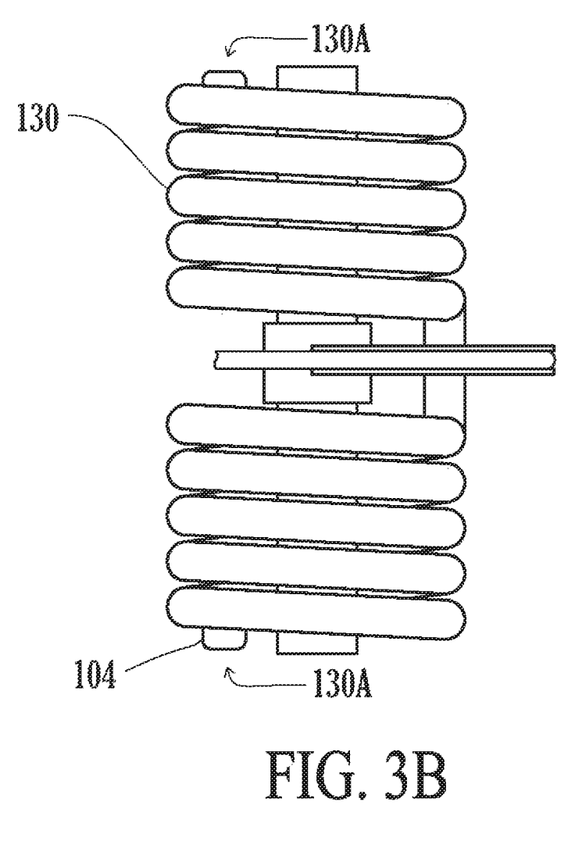
FIG. 3B is a top plan view of the double fixed-arm torsion spring and cam of FIG. 3A positioned on the extreme end of the coils, in a fully deployed position.

As shown in FIGS. 2A through 3B, the system 100 is configurable with various torsion spring designs and cam arrangements. FIG. 2A depicts the system 100 in a fully tensioned state having a torsion spring 103 positioned in between a fixed arm 103A at one spring end and the movable arm 103B at the opposite spring end, where it engages the cam 101. FIG. 2B depicts the device configuration as FIG. 2A, but in a fully deployed state. FIG. 3A depicts the system 100 in a fully tensioned state configured with a torsion spring 130 having two fixed arms 130A at either end of the spring 130 connected with two fixed pins 104, with a moveable arm 130B in the middle of the coils where it engages the cam 101. FIG. 3B depicts the device in a fully deployed state having a torsion spring 103 with the movable arm 130B at another extreme end of spring where it engages the cam 101.

Figure 4A:
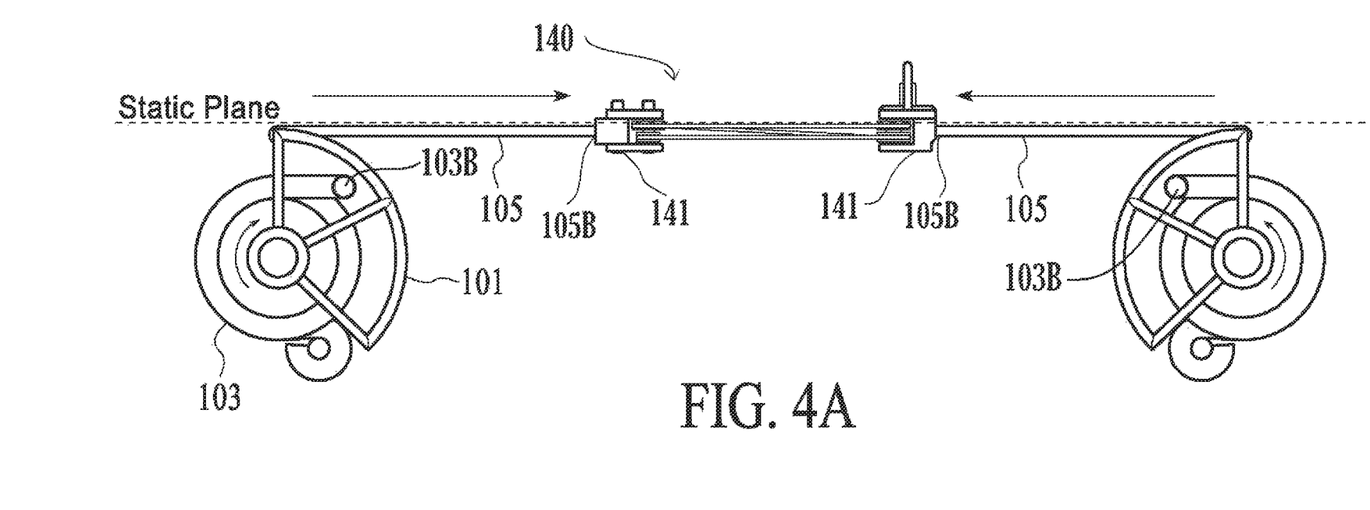
FIG. 4A is a side elevation view of two systems in a fully tensioned position, with cables connecting at either end of a counter-acting block and tackle that shares a single plane, yet omitting the associated compact arrow launching device.
Figure 4B:
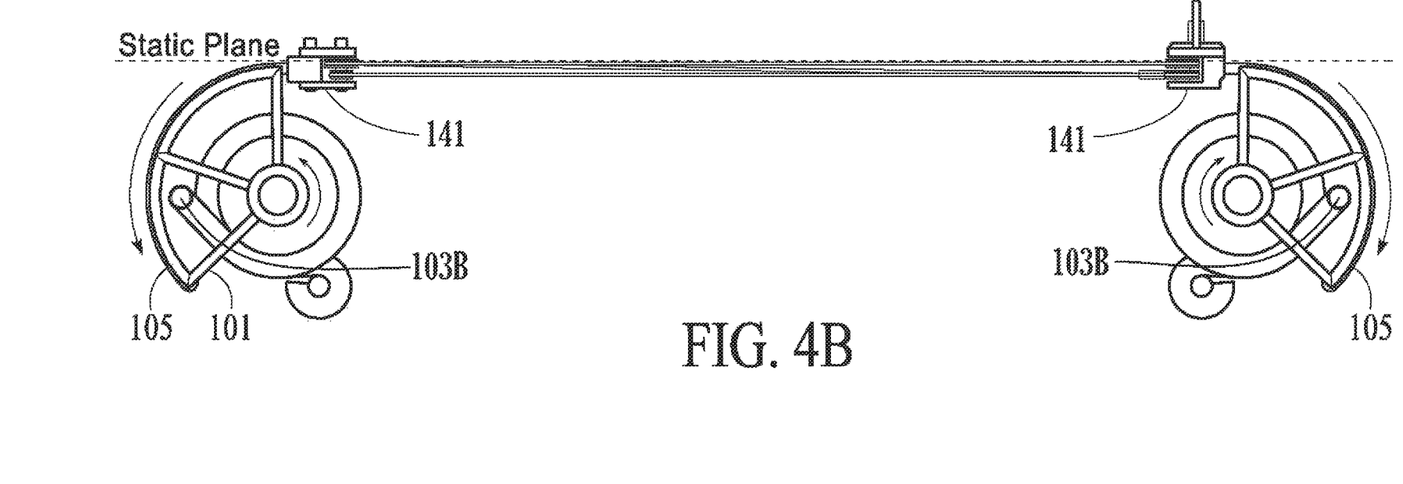
FIG. 4B is a side elevation view of the two systems of FIG. 4A, but shows the systems in the fully deployed position sharing a single plane with the counter-acting block and tackle.

FIGS. 4A and 4B depict the system 100 positioned at either end of a moveable block and tackle 140 within a compact arrow launching device (not shown for clarity). System 100 is connected to each movable pulley or pulley block 141 via free cable ends 105B of the cable 105. As shown in FIG. 4A, tension from the block and tackle 140 encourage the cable 105 (or at least a portion of the cable 105 not wrapped about a portion of the cam 101) to travel on a static plane directly toward each other. As rotation of the top of cam 101 has permitted a significant length of cable 105 to be tensioned by torsion spring 103, while maintaining the block and tackle 140 on a static plane, system 100 has remained compact. The block and tackle 140 as used herein may take various forms. By way of comparison, an extension spring, as shown in U.S. Patent Publication 2015/0354916, typically requires a solid length of coils that is additional, and exceeding of its working spring travel distance, which is not consistent with a compact design. As shown in FIG. 4B, tension has been released from within the block and tackle 140 and, as a result, the elastic energy leveraged within the cam 101 and cable 105 has been accelerated while maintaining the block and tackle 140 on a static plane. Alignment of the cable 105 with the plane of the pulley or pulley block 141 travel reduces vibrations from being introduced into the pulley system, and ultimately lowers potential vibration disruption to an arrow traveling on the same plane. System 100 achieves significant acceleration by focusing the energy retained in the entire torsion spring 103 into just a small, low-mass, movable portion of the torsion spring 103, the torsion spring movable arm 103B, which transfers the elastic energy into the cam 101 which imparts angular velocity through the light-weight cable 105 to the block and tackle 140, while maintaining travel on the static plane. By way of comparison, extension and compression springs do not impart angular velocity and have spring travel that is burdened with the vast majority of the spring mass, which inhibit travel velocity. While the exemplary embodiment utilizes a circle-sector profile cam to maintain a static plane of travel for cable 105 throughout the duration of deployment, alternative embodiments may use an elliptical-sector shaped cam, for example.

Figure 5A:
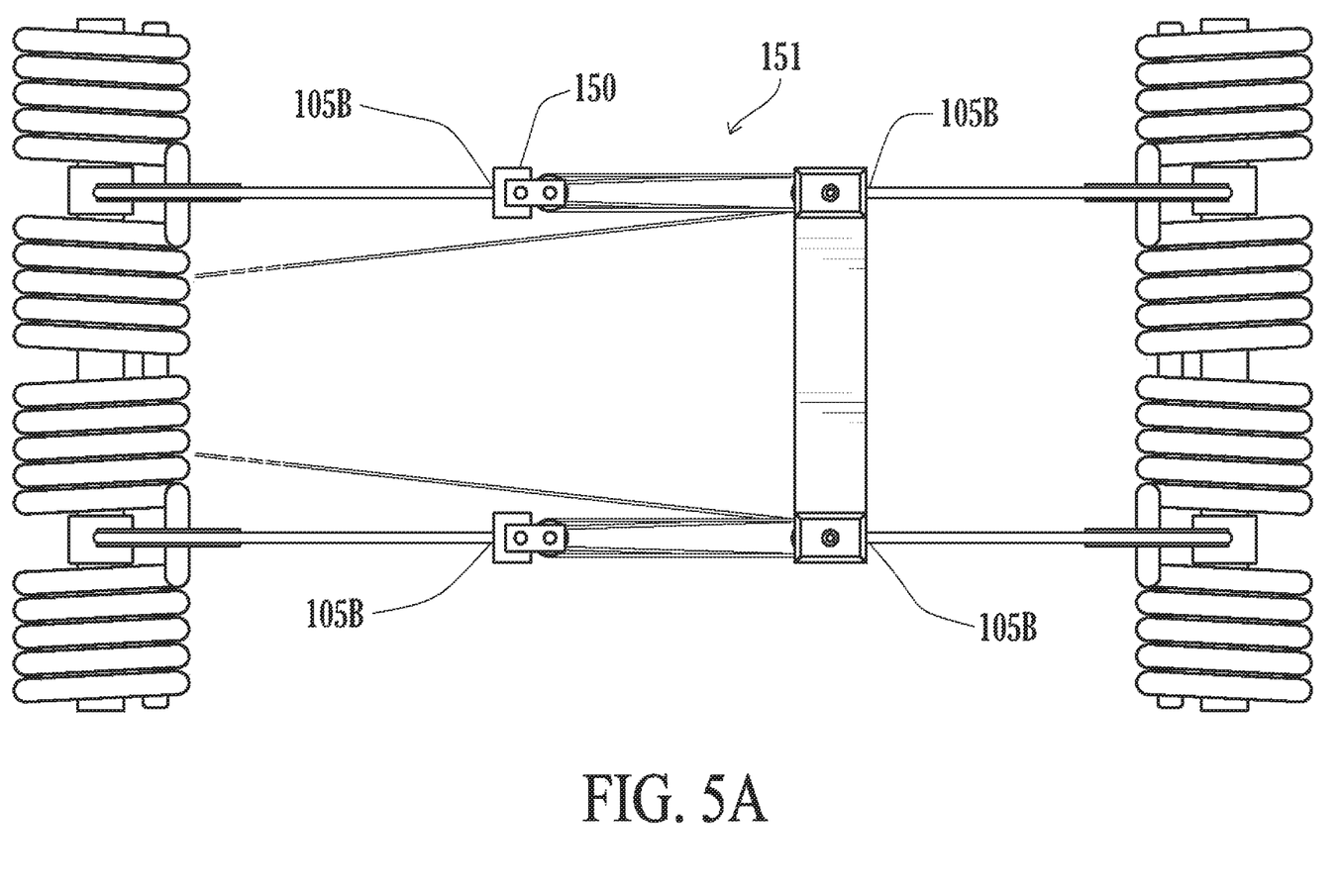
FIG. 5A is a top plan view of four systems in a fully tensioned position, with cables connecting at either end of each counter-acting block and tackle, yet omitting the associated compact arrow launching device.
Figure 5B:
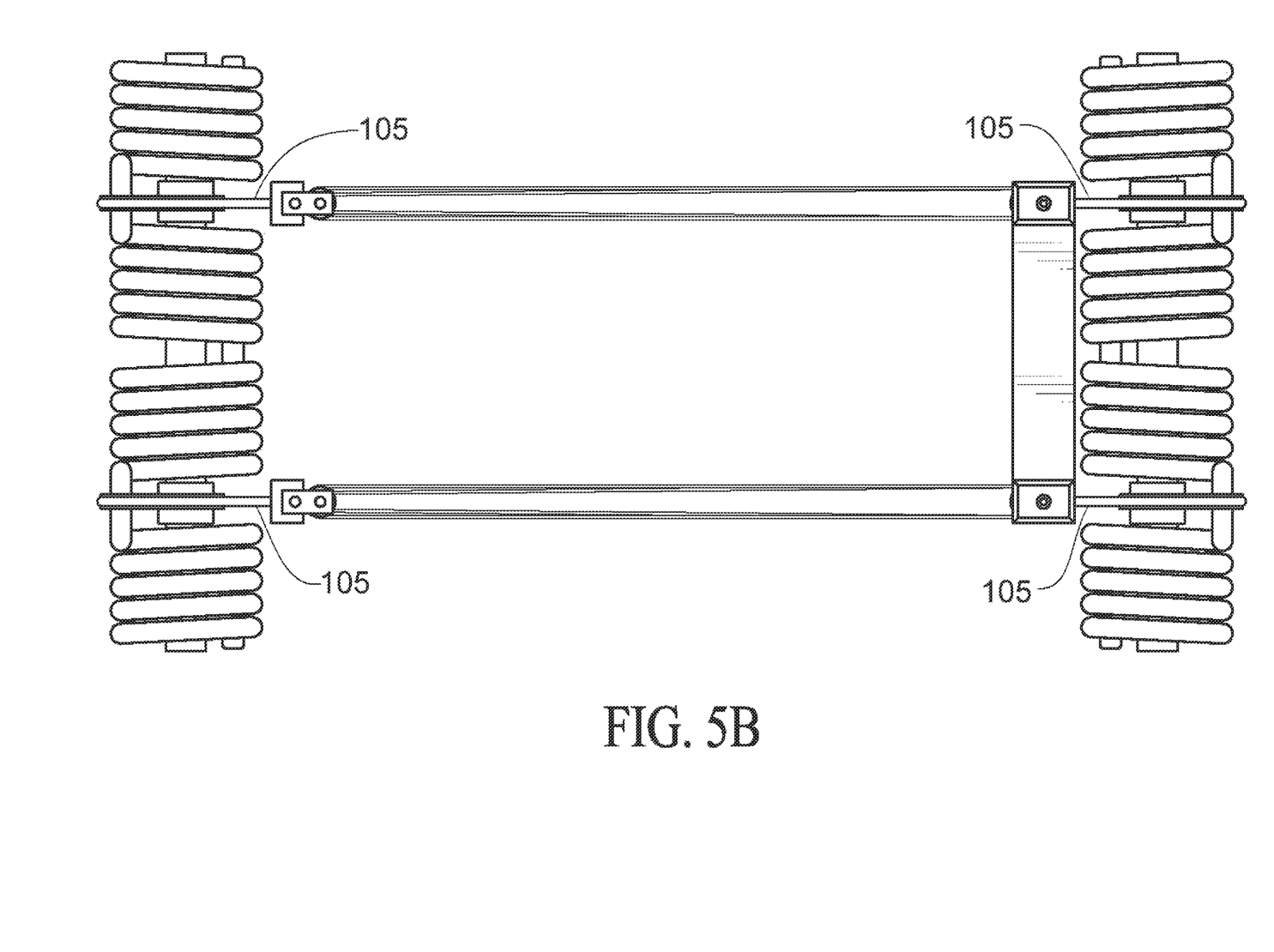
FIG. 5B is a top plan view of the four systems of FIG. 5A, but shows the systems in the fully deployed position.

FIGS. 5A and 5B illustrate the system 100 within a compact arrow launch device (not shown, see FIG. 9) having counter-acting block and tackle pulleys 150. FIG. 5A shows tension from the block and tackles 151 encouraging all the cable ends 105B of the cable 105 to travel directly toward each other. FIG. 5B shows a post-deployment position of the system 100. FIGS. 5A and 5B demonstrate the system 100 maintaining compact dimensions while storing elastic energy and at full deployment.

Figure 6:
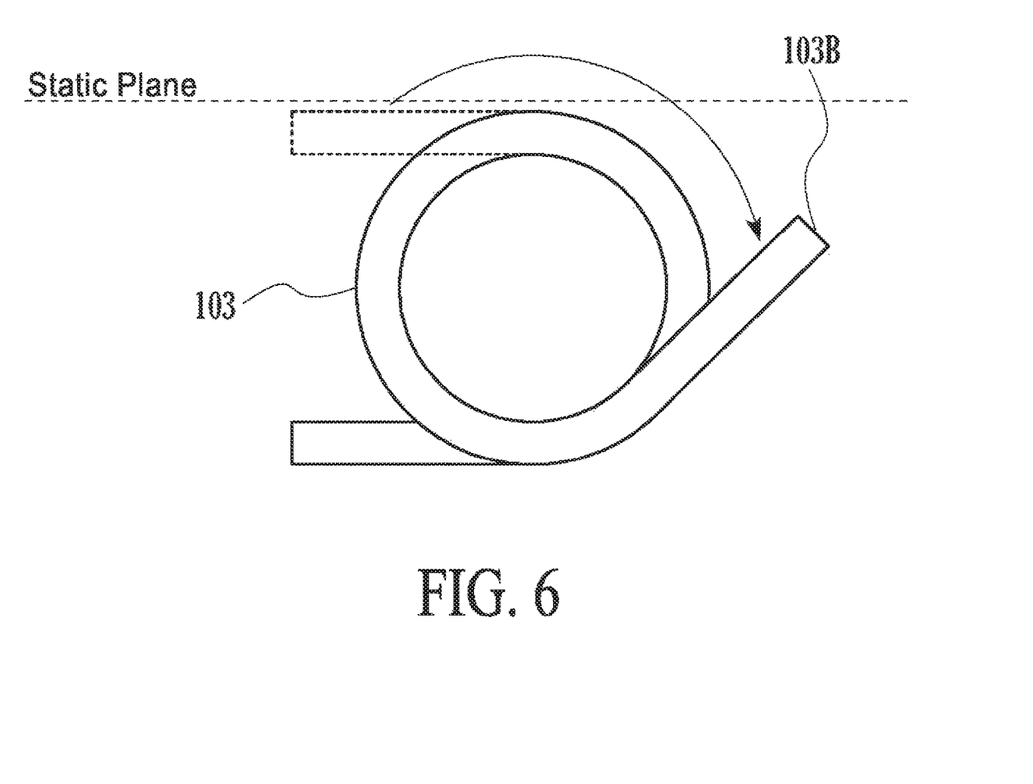
FIG. 6 is a side elevation view of a torsion spring illustrating the movement of the arm in comparison to a static plane.

FIG. 6 illustrates the movement of torsion springs 103. The sole use of this spring is not suitable to maintain a static plane across the range of motion of the moveable spring arm 103B. A static plane is critical in maintaining smooth linear travel within a block and tackle.

Figure 7:
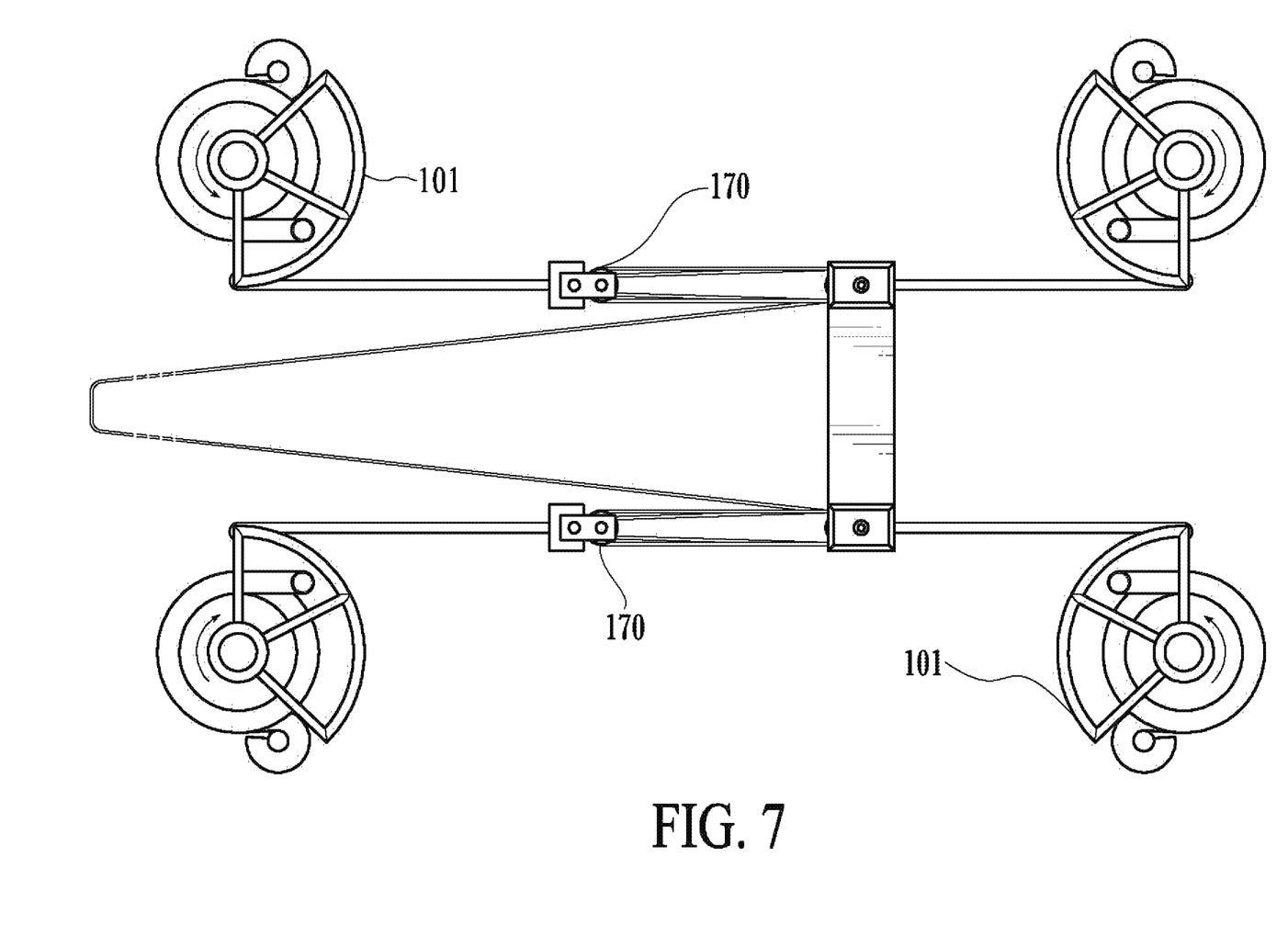
FIG. 7 is a top plan view of four systems mounted in an alternative position, fully tensioned, with cables connecting at either end of each counter-acting block and tackle, yet omitting the associated compact arrow launching device.

A variety of configurations of system 100 are possible. As few as one embodiment may be included in a compact arrow launching system using counter acting block and tackles. Alternatively, the system can be configured in alternate positions. FIG. 7 shows the system 100 deployed with the cams 101 aligned to rotate on the same plane as pulleys 170 in a compact arrow launching device that has counter-acting block and tackles.

Figure 8A:
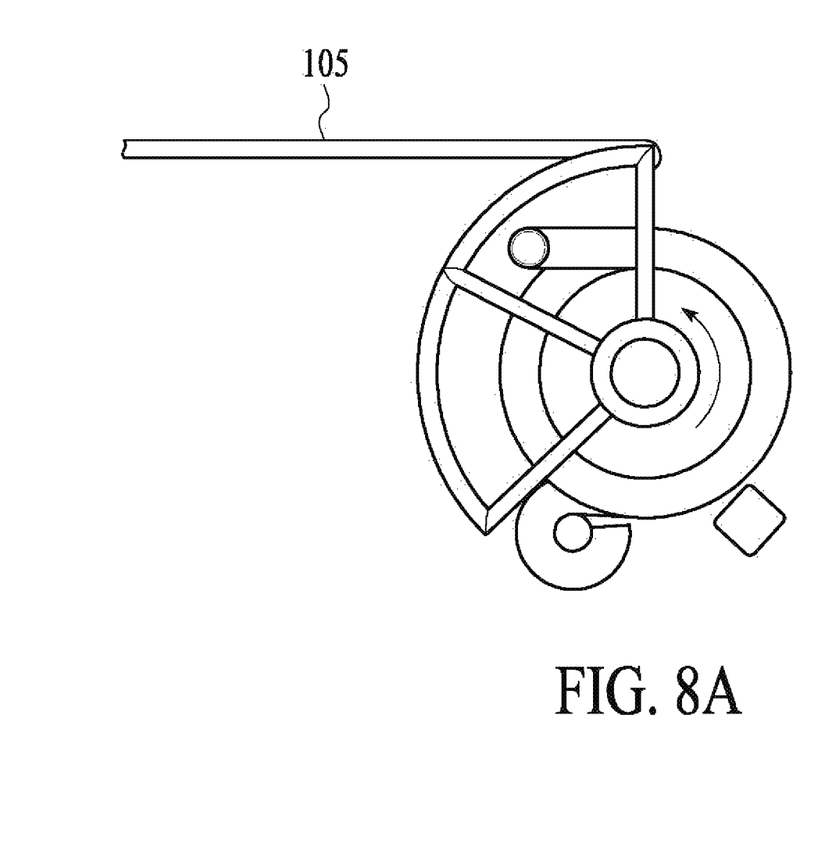
FIG. 8A is a side elevation view of the system in a tensioned position, having a shock absorbing cam rest according to an exemplary embodiment of the present invention.
Figure 8B:
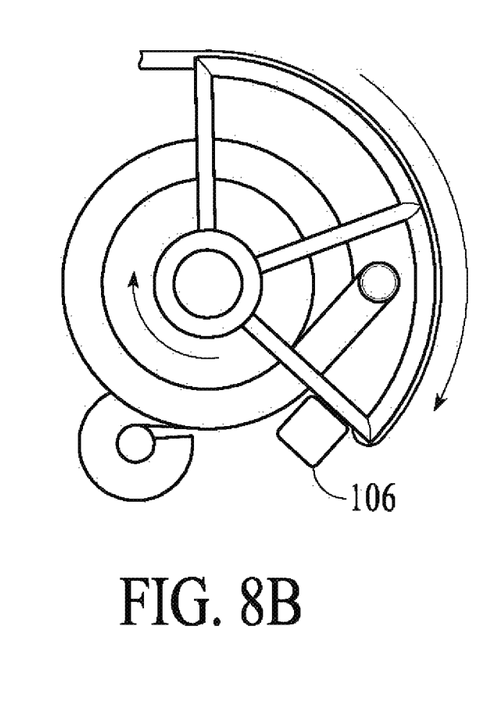
FIG. 8B is a side elevation view of the system in a deployed position, the cam resting on the shock-absorbing cam rest.

FIGS. 8A and 8B illustrate an aspect of the cams 101 that enables shock absorption. FIG. 8A shows the cable 105 held in tension. The cable 105 construction may be of a material with elastic properties. It is desirable that the elastic threshold be stable within cable 105 to aid efficient deployment until the cable reaches an abrupt stop, when the elastic threshold is useful in absorbing shock loading. FIG. 8B illustrates the inclusion of cam rest 106 having deformable shape memory properties, mounted in front of the cam 101 opposite the spring wind direction. The shock absorbing aspects may be use alone or in combination.

FIG. 9 illustrates an example of the system 100 in one possible arrangement within a compact arrow propulsion device 190 that has a counter-acting block and tackle 191. The system 100 is connected to the compact arrow propulsion device via the fixed pins 104, fixed axles 102, and the free ends 105B of cable 105.

Figure 10A:
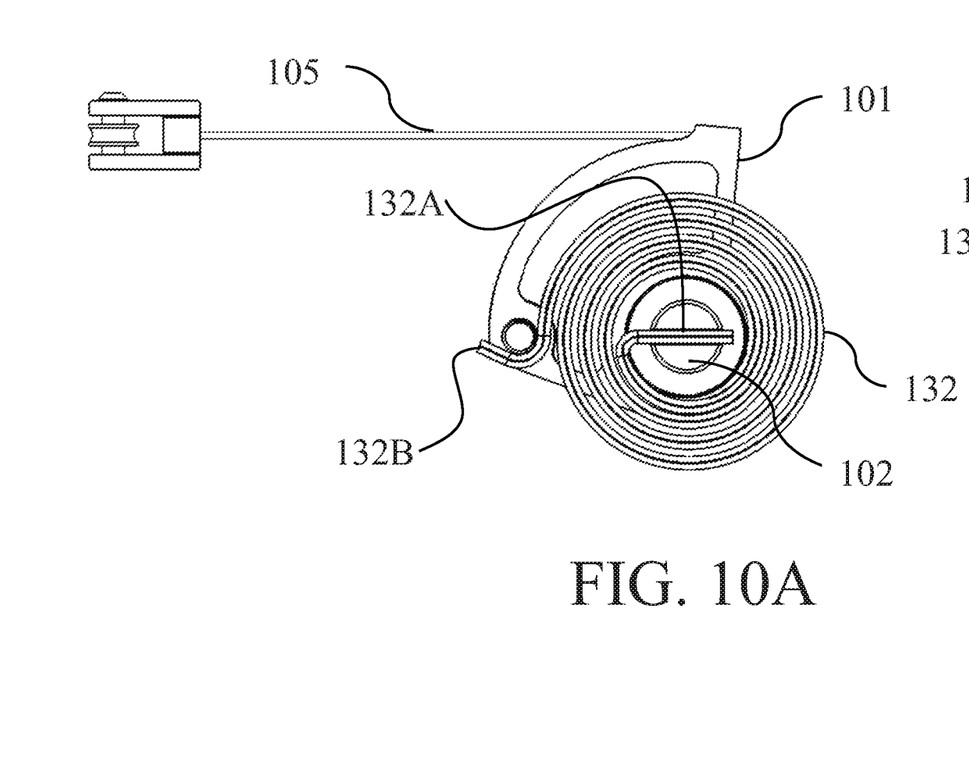
FIG. 10A is a side elevation view of an alternate embodiment of an elastic energy storage and deployment system utilizing a spiral torsional spring in the tensioned position.
Figure 10B:
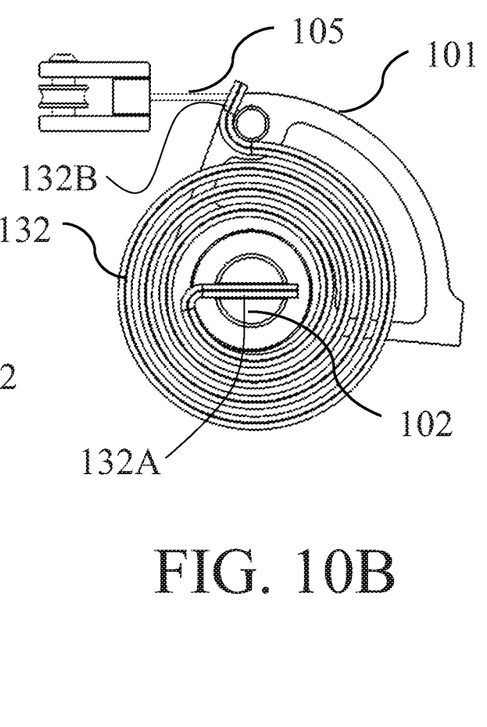
FIG. 10B is a side elevation view of the system of FIG. 10A, shown in the deployed position.

FIGS. 10A and 10B depict an alternate configuration of the system 100 employing a spiral type torsion spring 132, commonly referred to as a clock spring. In this configuration, the inner arm 132A of spiral type torsion spring 132 is held in a fixed position within a notch 134 (see FIGS. 12A and 12B) in the end of fixed axle 102. Cam 101 is mounted on fixed axle 102 beside spiral type torsion spring 132 such that the cam 101 may engage and rotate an outer arm 132B (also referred to movable arm 132B) of spiral type torsion spring 132 to a fully tensioned position, as depicted in FIG. 10A. The outer arm 132B of spiral type torsion spring 132 is then able to deploy its stored energy while rotating cam 101 back to a deployed position, as shown in FIG. 10B. Variations of this configuration may employ spiral type torsion springs on either side or both sides of each cam 101.

Figure 11A:
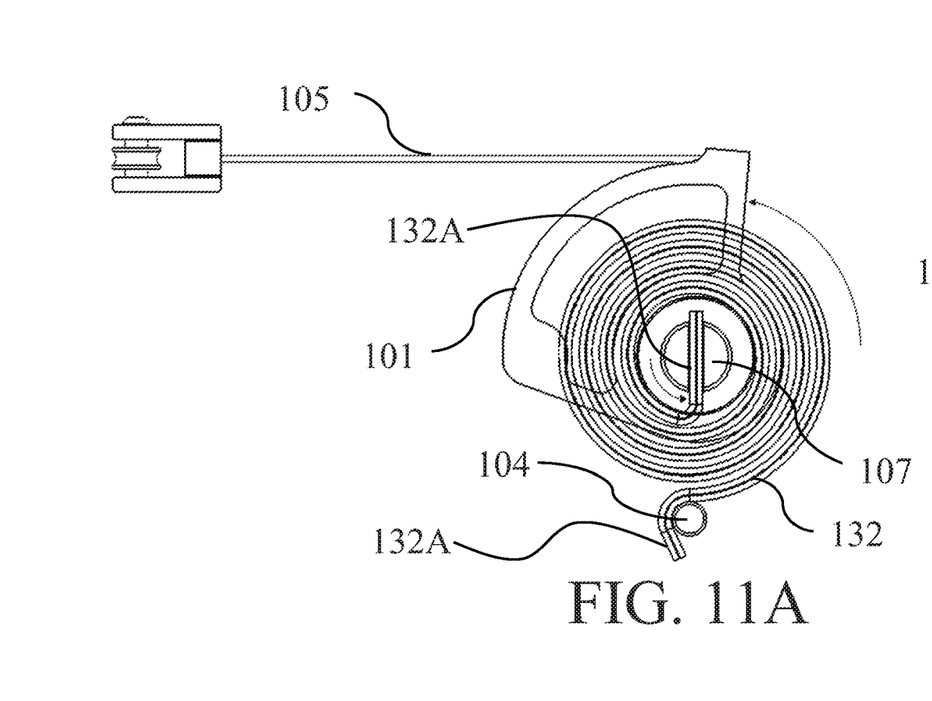
FIG. 11A is a side elevation view of an alternate embodiment of an elastic energy storage and deployment system utilizing a spiral torsional spring in the tensioned position, where the inner arm of the spiral torsional spring is moveable and rotates the axle which is fixed to the cam, while the outer arm of the spiral torsion spring is fixed in place.
Figure 11B:
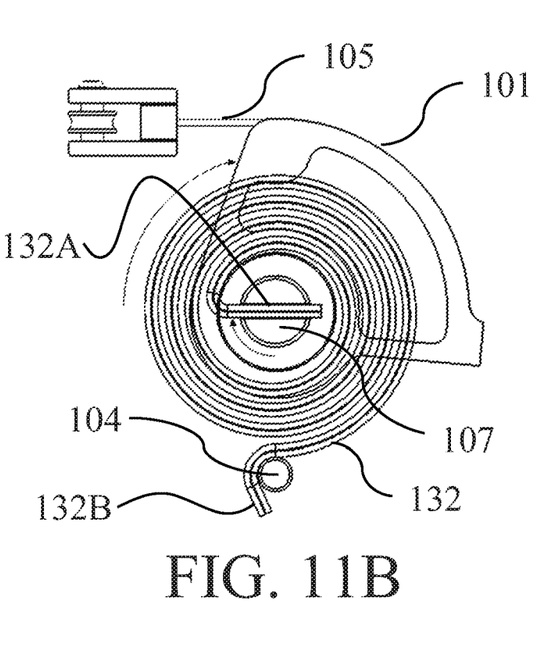
FIG. 11B is a side elevation view of the system of FIG. 11A, shown in the deployed position.

The employment of a spiral type torsion spring 132 also allows for another configuration of system 100 in which the inner arm 132A of the spiral type torsion spring 132 is moveable while the outer arm 132B is held in a fixed position by fixed pin 104. As shown in FIG. 11A, cam 101 is mounted in a fixed position to a rotating axle 107 that has been engaged and rotated to the fully tensioned position by the movable inner arm 132A of spiral type torsion spring 132. When the system 100 is deployed, the stored energy in spiral type torsion spring 132 is transferred from its movable inner arm 132A to the notch 134 (see FIGS. 12A and 12B) where it engages moveable axle 107, thus rotating the moveable axle 107 which is fixed to cam 101 to the fully deployed position, as shown in FIG. 11B. Variations of this configuration may employ as few as one spiral type torsional spring 132 to rotate one or more cam(s) 101 by at least one moveable axle 107.

Figure 12A:
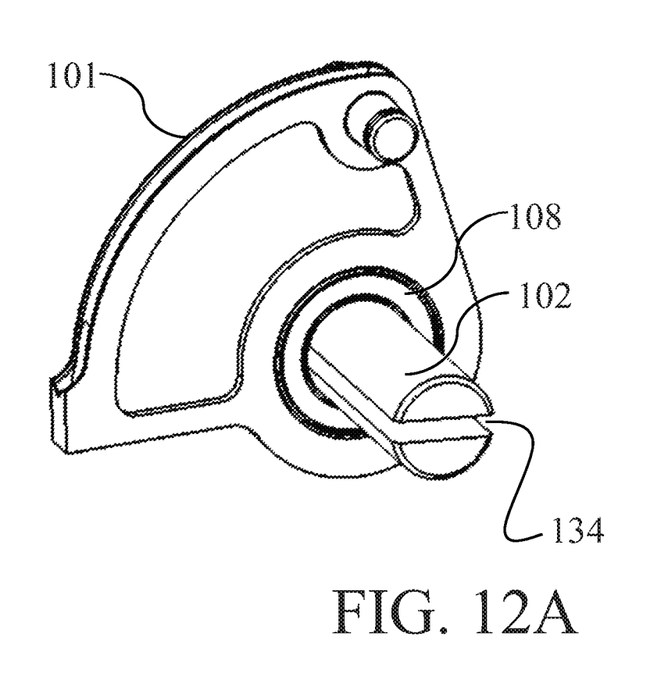
FIG. 12A is a perspective view illustrating an axle bearing mounted within the cam to rotate independent of the axle.
Figure 12B:
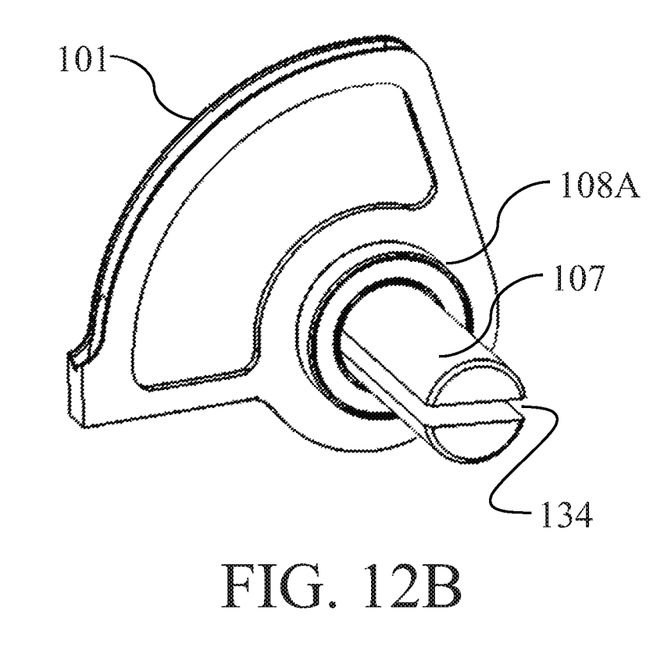
FIG. 12B is a perspective view illustrating an axle bearing mounted beside the cam which is fixed in place to rotate with the axle.

As illustrated in FIGS. 12A and 12B, an axle bearing 108, 108A may be used to reduce the friction of movement within system 100. As shown in FIG. 12A, axle bearing 108 may be mounted over fixed axle 102 and within the pivot point of cam 101, so that friction is reduced when cam 101 independently rotates about fixed axle 102. Alternatively, when employing a moveable axle 107 fixed to cam 101, axle bearing 108A can be mounted beside cam 101 and over moveable axle 107 to reduce friction as movable axle 107 directly rotates cam 101, as shown in FIG. 12B. In this configuration, one or more axle bearings may be employed within system 100 and/or which may utilize one or more bearing pillow blocks (not shown) to support system 100 within a compact arrow launching device that has counter-acting block and tackles.

Hence, the various embodiments of the invention provide multiple benefits, which include the following: torsion springs can be deployed with greatly reduced inertial burden imposed by the spring mass on the velocity within the system and be very narrow, light-weight and compact, and reliable under a range of weather conditions. Additionally, shock absorbing aspects of the invention provide low noise deployment and low shock load burden. As an example of this benefit, in the comparison to extension or compression springs, the system 100 delivers a higher velocity to the movable pulley or movable pulley block with the same elastic force, without a large space requirements for spring extension and retraction movement, without loud, resonant spring vibrations and without a high shock load burden on the compact arrow launching device that has counter-acting block and tackle.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense, it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An elastic energy storage and deployment device comprising:
    at least one torsion spring having at least one fixed first arm and one movable arm;
    a cam having a circular sector or elliptical sector profile connected to the movable arm of the at least one torsion spring;
    a axle positioned within coils of the torsion spring and within a pivot-axis of the cam; and
    a flexible cable having a first end and a second end, the first end and second end aligning the flexible cable within a channel along a length of a top portion of the cam, the first end of the cable connected at one end of the cam arc that is opposed to a direction of wind of the at least one torsion spring.

2. The elastic energy storage and deployment device of claim 1, wherein the second end of the cable is connected to a pulley or a pulley block and tackle system.

3. The elastic energy storage and deployment device of claim 2, wherein the pivot-axis of the cam is parallel to a pivot axis of the pulley.

4. The elastic energy storage and deployment device of claim 2, wherein the pivot-axis of the cam is perpendicular to a pivot axis of the pulley.

5. The elastic energy storage and deployment device of claim 1, further comprising a cam rest configured to absorb at least a portion of energy from the cam when the torsion spring moves the cam from a tensioned position to a rest position.

6. The elastic energy storage and deployment device of claim 5, wherein the cam rest has shape memory properties with a deformable state and a static state.

7. The elastic energy storage and deployment device of claim 1, wherein the cam includes first and second cams of a first set of cams disposed on a first torsion spring and first and second cams of a second set of cams disposed on a second torsion spring, the first cams of the first and second sets of cams disposed between first and second pulleys of block and tackle, and the second cams of the first and second sets of cams disposed between third and fourth pulleys of the block and tackle.

8. The elastic energy storage and deployment device of claim 1, wherein a cam arc of the cam spans from about 90 to about 180 degrees.

9. The elastic energy storage and deployment device of claim 1, wherein the cam is fixed to the axle and the one movable arm of the at least one torsion spring is fixed to the axle.

10. An elastic energy storage and deployment device comprising:
    at least one spiral torsion spring having at least one fixed inner arm and at least one movable outer arm;
    a cam having a circular sector or elliptical sector profile connected to the movable outer arm of the spiral torsion spring in a position that aligns a cam arc of the circular or elliptical sector profile at a top of the cam with a travel arc of the movable outer arm;
    a fixed axle connected to the fixed inner arm and positioned within coils of the spiral torsion spring and within a pivot-axis of the cam; and
    a flexible cable having a first end and a second end, the first end and second end aligning the flexible cable within a channel along a length of the top of the cam, the first end of the cable connected at one end of the cam arc that is opposed to a direction of the torsion spring wind.

11. The elastic energy storage and deployment device of claim 10, wherein the second end of the cable is connected to a pulley or a pulley block and tackle system.

12. The elastic energy storage and deployment device of claim 11, wherein the pivot-axis of the cam is parallel to a pivot axis of the pulley.

13. The elastic energy storage and deployment device of claim 11, wherein the pivot-axis of the cam is perpendicular to a pivot axis of the pulley.

14. The elastic energy storage and deployment device of claim 10, further comprising a cam rest configured to absorb at least a portion of energy from the cam when the torsion spring moves the cam from a tensioned position to a rest position.

15. The elastic energy storage and deployment device of claim 14, wherein the cam rest has shape memory properties with a deformable state and a static state.

* * * * *